United States Patent
Kemmer et al.

(10) Patent No.: US 7,904,232 B2
(45) Date of Patent: Mar. 8, 2011

(54) METHOD FOR OPERATING AN INTERNAL COMBUSTION ENGINE

(75) Inventors: Helerson Kemmer, Vaihingen (DE); Corren Heimgaertner, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 10 days.

(21) Appl. No.: 12/300,606

(22) PCT Filed: May 16, 2007

(86) PCT No.: PCT/EP2007/054778
§ 371 (c)(1), (2), (4) Date: Apr. 8, 2009

(87) PCT Pub. No.: WO2007/135066
PCT Pub. Date: Nov. 29, 2007

(65) Prior Publication Data
US 2009/0210133 A1   Aug. 20, 2009

(30) Foreign Application Priority Data
May 19, 2006   (DE) .................... 10 2006 023 693

(51) Int. Cl.
*F02D 41/00*   (2006.01)
(52) U.S. Cl. ........................................ 701/103; 701/104
(58) Field of Classification Search .......... 701/101–105, 701/114–115; 123/299, 436, 478, 480, 486, 123/673–674
See application file for complete search history.

(56) References Cited

U.S. PATENT DOCUMENTS

| | | | |
|---|---|---|---|
| 5,063,901 A * | 11/1991 | Kaneyasu et al. | 123/406.13 |
| 5,357,928 A | 10/1994 | Ohtsuka | |
| 5,661,971 A | 9/1997 | Waschatz et al. | |
| 5,819,714 A | 10/1998 | Bush et al. | |
| RE37,807 E * | 7/2002 | Shinogle et al. | 123/480 |
| 6,671,611 B1 * | 12/2003 | Peltier | 701/104 |
| 6,712,045 B1 * | 3/2004 | McCarthy, Jr. | 123/456 |
| 6,785,600 B2 * | 8/2004 | Birk et al. | 701/104 |
| 6,945,221 B2 * | 9/2005 | Baeuerle | 123/319 |
| 6,986,245 B2 * | 1/2006 | Moser | 60/39.281 |
| 7,093,586 B2 * | 8/2006 | Mattes | 123/478 |
| 2005/0172930 A1 * | 8/2005 | Pitzal et al. | 123/299 |
| 2008/0077306 A1 * | 3/2008 | Kloppenburg et al. | 701/104 |

FOREIGN PATENT DOCUMENTS

| | | |
|---|---|---|
| DE | 4304110 | 9/1993 |
| EP | 0416856 | 3/1991 |
| EP | 0715062 | 6/1996 |
| EP | 1026374 | 8/2000 |
| EP | 1083325 | 3/2001 |

OTHER PUBLICATIONS

International Search Report, PCT International Patent Application No. PCT/EP2007/054778, dated Aug. 6, 2007.

* cited by examiner

*Primary Examiner* — Stephen K Cronin
*Assistant Examiner* — Johnny H Hoang
(74) *Attorney, Agent, or Firm* — Kenyon & Kenyon LLP

(57) ABSTRACT

An internal combustion engine includes a plurality of cylinders, into whose combustion chambers the fuel is introduced individually for each cylinder. It is proposed that, during a time period a setpoint fuel quantity is varied individually for each cylinder in such a way that the average formed over the time period equals, at least approximately, a normal setpoint fuel quantity which would have to be injected without the above-mentioned variation for inducing or maintaining a setpoint operating state of the internal combustion engine.

19 Claims, 3 Drawing Sheets

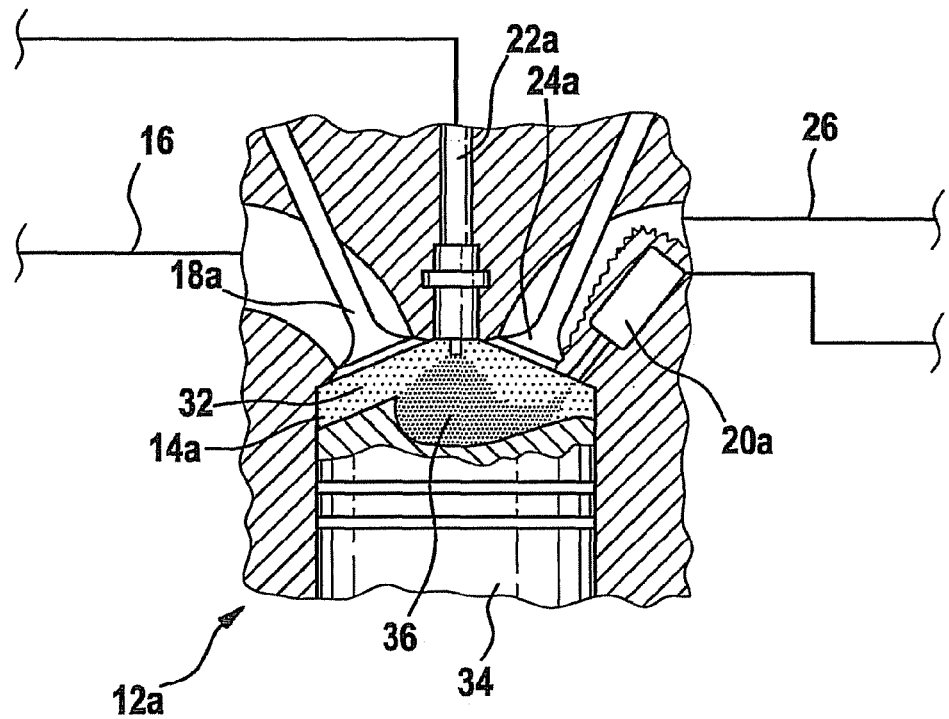
Fig. 2
Fig. 3
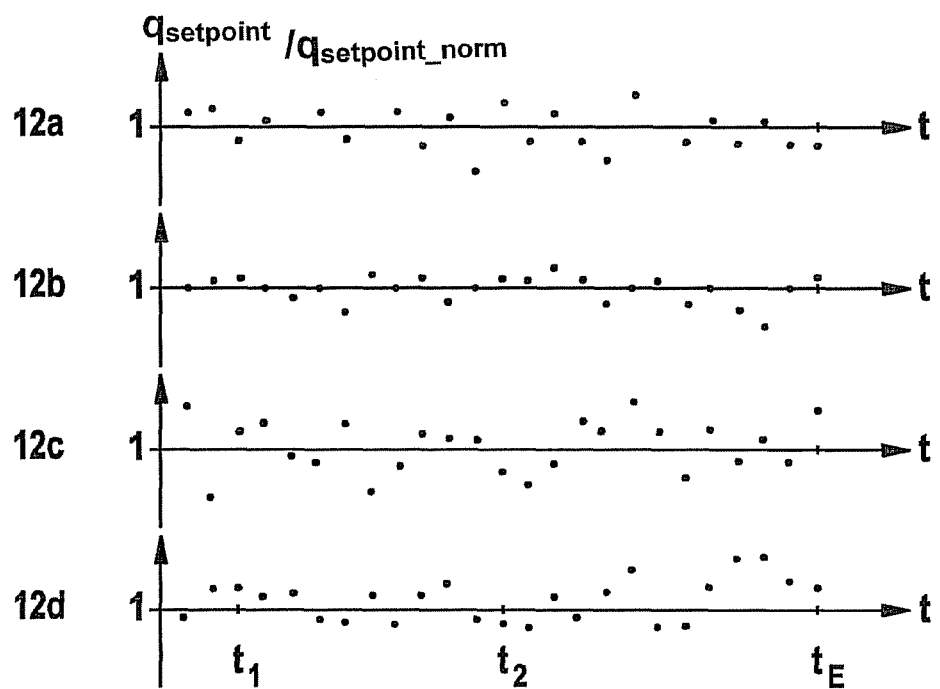

METHOD FOR OPERATING AN INTERNAL COMBUSTION ENGINE

FIELD OF THE INVENTION

The present invention relates to a method, a computer program, an electric memory medium, and a control and a regulating device for operating an internal combustion engine.

BACKGROUND INFORMATION

In conventional internal combustion engines, an injector, which injects the fuel, namely gasoline, directly into the combustion chamber, is associated with each combustion chamber. The exhaust gases of the internal combustion engine are purified by at least one catalytic converter. In a conventional method in internal combustion engines having intake manifold injection, the fuel is metered individually for each cylinder and is introduced into the combustion chambers by one or more injection devices.

SUMMARY

An object of the present invention is to refine the conventional method in such a way that the emission of pollutants is minimized during the operation of the internal combustion engine.

Below, features of example embodiments of the present invention are described. Individual features may be important for the present invention also in completely different combinations.

For effectively purifying the exhaust gases, it is generally necessary that the catalytic converter have the highest possible temperature level. When the example method according to the present invention is used, the exhaust gas temperature is increased, thereby also increasing the temperature level of the catalytic converter. The emissions may thus be reduced. According to the present invention, this may be possible without additional fuel consumption and without additional components being required.

According to an example embodiment of the present invention, an intentional, i.e., fully conscientiously induced or activated cylinder-individual variation of the injected fuel quantity generates, at least from time to time, a rather rich mixture in one cylinder, while a rather lean mixture is generated in the other cylinder. A rather rich mixture results in an excess of hydrocarbons (HC) in the exhaust gas; a rather lean mixture results in an excess of oxygen ($O_2$) in the exhaust gas. These two components cause an exothermal reaction to take place upstream from the catalytic converter and in the catalytic converter itself, which increases the exhaust gas temperature, thereby heating the catalytic converter relatively quickly.

The torque and the rotational speed are at least generally unaffected by this measure because, according to the example embodiments of the present invention, the average value of the fuel quantity injected into each cylinder, i.e., into each combustion chamber, is equal to a normal setpoint fuel quantity. This is the conventional setpoint fuel quantity which would have to be injected without the proposed intentional variation in order to induce or maintain a setpoint operating state of the internal combustion engine, i.e., to provide a certain rotational speed (in idling), and/or a certain torque, and/or a certain mixture, for example.

In a first advantageous refinement of the present invention, the variation from one combustion cycle to another combustion cycle is redefined. The variation of the injected fuel quantity is distributed to the largest possible number of combustion cycles, which smoothes the influences on the operation of the internal combustion engine.

It is furthermore proposed that the variation be random in a desired manner, for example, be predefined by a random function, which may be implemented in a simple manner. The term "random in a desired manner" should indicate that no random variation that is caused unintentionally, for example, by component tolerances or even by a defect or a malfunction of a component of the internal combustion engine, is meant but which is conscientiously induced and corresponds to a specification.

Such a random variation in a desired manner may be advantageously selected in such a way that the variation is a normal distribution whose highest probability density corresponds to the normal setpoint fuel quantity. Using such a known normal distribution in the form of Gauss's bell curve, it is ensured, in a simple way, that the fuel quantity injected over a certain period of time is in the range of the normal setpoint fuel quantity and thus the normal operation of the internal combustion engine is minimally influenced by the example method according to the present invention.

One simple implementation of the example method according to the present invention is that a factor which varies randomly in a desired manner and is normally distributed, whose highest probability density is one, is applied to the normal setpoint fuel quantity.

After a cold start of the internal combustion engine it is important in particular to bring the catalytic converter as rapidly as possible to a temperature level at which its exhaust gas-purifying function is established. Therefore, it is advantageous in particular to perform the method according to the present invention in a time period immediately after the start of the internal combustion engine.

Basically, the fuel may be introduced by single or multiple injection. The former is technically simpler; the latter has advantages with respect to emissions.

The example method according to the present invention may be effective in particular when the fuel is injected, at least during the above-mentioned time period, by a homogeneous split injection as is generally conventional for internal combustion engines having direct gasoline injection. In a refinement of this method, it is proposed that the time period during which the fuel quantity to be injected varies randomly in the desired manner and with a normal distribution corresponds to the time period during which the homogeneous split injection is performed. The normally distributed factor may be applied to only one of two homogeneous split injections, which reduces the computing effort.

It is also possible that the variations of the fuel quantities injected into the individual combustion chambers are linked in such a way that within one combustion cycle of all combustion chambers the setpoint fuel quantity to be injected averaged over the combustion chambers is equal to the normal setpoint fuel quantity. In this way, the total fuel quantity injected is equal to the normal setpoint fuel quantity in each combustion cycle.

BRIEF DESCRIPTION OF THE DRAWINGS

A particularly preferred exemplary embodiment of the present invention is explained below with reference to the figures.

FIG. 2 shows a partial section through an area of a cylinder of the internal combustion engine of FIG. 1.

FIG. 3 shows a diagram in which the ratio of a setpoint fuel quantity to a normal setpoint fuel quantity directly after a start of the internal combustion engine is plotted against time for the individual cylinders of the internal combustion engine of FIG. 2.

DETAILED DESCRIPTION OF EXAMPLE EMBODIMENTS

Figure 1:
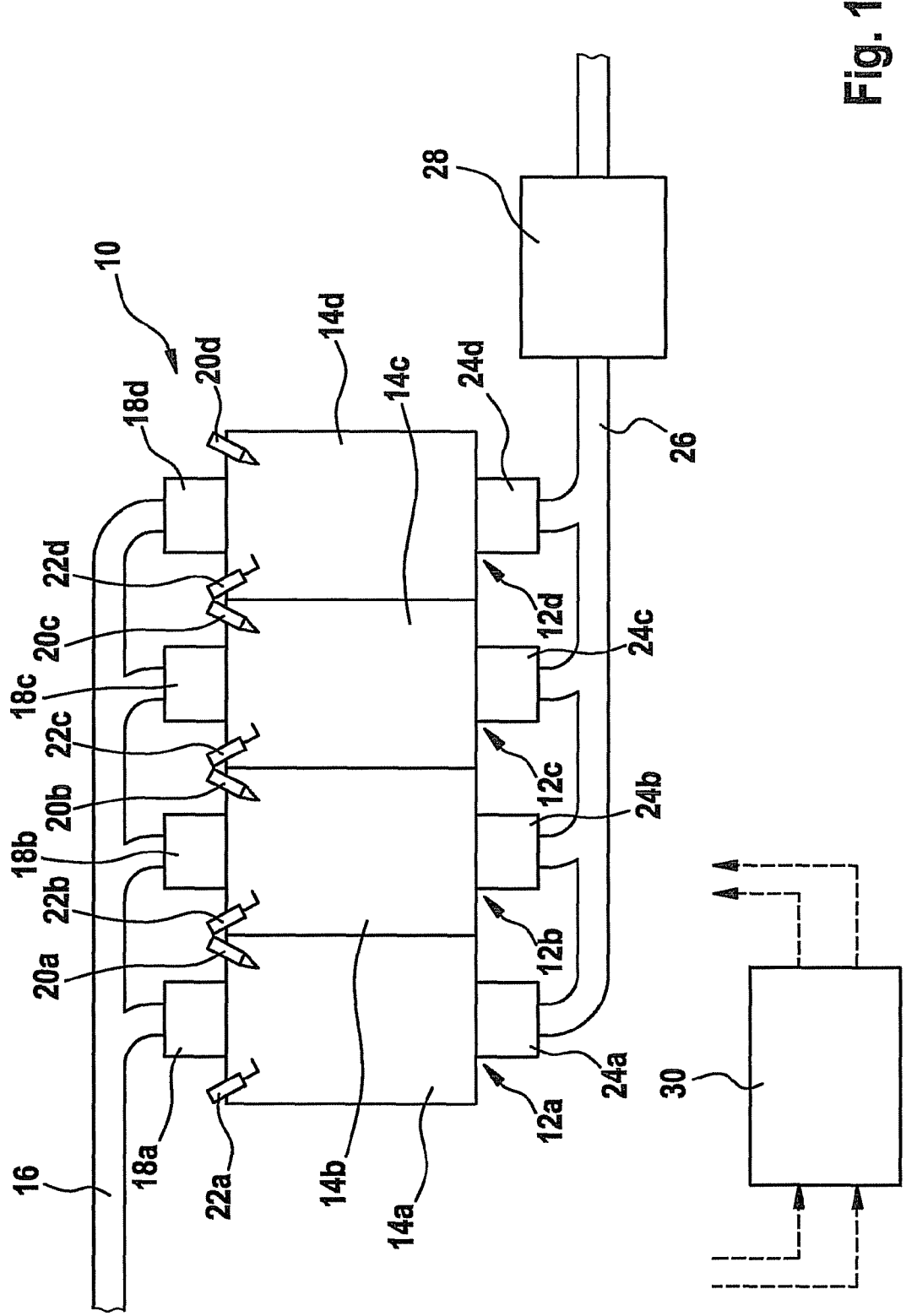
FIG. 1 schematically shows an internal combustion engine having multiple cylinders, each having a combustion chamber.

An internal combustion engine overall is identified by reference numeral 10 in FIG. 1. It includes a total of four cylinders 12a through 12d, having the respective combustion chambers 14a through 14d. Cylinder 12a is shown in greater detail in FIG. 2. Combustion air reaches combustion chambers 14a through 14d via an intake manifold 16 and intake valves 18a through 18d. In the present exemplary embodiment, fuel is injected into combustion chambers 14a through 14d via injectors 20a through 20d, respectively. Injectors 20a through 20d are connected to a "rail" (not depicted) in which the fuel is stored under high pressure. In this case, the fuel is gasoline; therefore, the internal combustion engine depicted in FIG. 1 is one having direct gasoline injection. However, the use of a gaseous fuel, of a biofuel, or of a synthetic fuel is also possible. In an exemplary embodiment not depicted, the fuel is injected into an intake manifold individually for each cylinder. Finally, most of the principles presented below apply to internal combustion engines having Otto-type combustion, or to internal combustion engines having external ignition.

The fuel-air mixture in combustion chambers 14a through 14d is ignited by a spark plug 22a through 22d, respectively. The hot combustion gases are removed from combustion chambers 14a through 14d via discharge valves 24a through 24d into an exhaust gas pipe 26, which leads to a catalytic converter system 28, which converts pollutants in the exhaust gas and thus purifies the exhaust gas. The operation of internal combustion engine 10 is controlled and regulated by control and/or regulating unit 30, which receives signals from different sensors and actuators (not depicted in FIG. 1) of internal combustion engine 10. These include, for example, an accelerator pedal transducer, using which a user of internal combustion engine 10, which is installed in a motor vehicle, may express a torque request. Furthermore, these sensors include temperature sensors which detect the operating temperature of internal combustion engine 10, an HFM sensor, which detects the air mass reaching combustion chambers 14a through 14d via intake manifold 16, and lambda sensors, which are situated in the area of catalytic converter system 28 and detect the ratio of the fuel-air mixture in combustion chambers 14a through 14d. Injectors 20, spark plugs 22, and a throttle valve (not depicted in FIG. 1) in intake manifold 16, for example, are controlled by control and regulating unit 30 (when the index is not shown in a reference numeral, it means here and in the following that the corresponding statements apply to all components of the same type).

To achieve optimum conversion of the pollutants contained in the exhaust gas, catalytic converter system 28 must have a certain operating temperature. Since catalytic converter system 28 is also still cold immediately after the start of cold internal combustion engine 10, the conversion rate of the pollutants contained in the exhaust gas during this period is relatively low. To reduce emissions, catalytic converter system 28 is heated up as rapidly as possible after the start of cold internal combustion engine 10.

An optimum strategy for heating up catalytic converter system 28 after start combines low raw emissions and a high heating performance at the same time. The injection strategy "homogeneous split," also abbreviated "HSP," has been developed for this purpose. In this strategy, a first injection by a first injector 20 is injected into combustion chamber 14 during the intake cycle of a cylinder 12. This produces a homogeneous, yet lean, basic mixture. In FIG. 2, this is labeled 32.

A second injection takes place during the compression phase. This second injection, supported by an appropriate shape of the top of a piston 34, produces a relatively rich mixture cloud in the area of spark plug 22. In FIG. 2, this is labeled 36. The point in time of the injection and the split of the quantity between the first and the second injections are designed in such a way that, considering the transport time, an ignition angle may be implemented allowing a largely dethrottled and smooth operation with combustion that is free of misfirings. Due to the retarded position of the center of gravity, most of the freed energy is not converted into mechanical energy, but is released in the exhaust gas stream as heat. This makes rapid heating of catalytic converter system 28 possible.

To achieve a certain rotational speed or a certain torque of internal combustion engine 10, control and regulating unit 30 establishes a certain normal setpoint fuel quantity $q_{setpoint\_norm}$ for each cylinder 12a through 12d. As FIG. 3 shows, a factor varying in a desired manner, namely randomly according to a random function for each cylinder 12a through 12d (individually for each cylinder), and having a normal distribution and a maximum probability density equal to one, is applied to this fuel quantity. Setpoint fuel quantity $q_{setpoint}$, which is to be injected into a combustion chamber 14 by a corresponding injector 20, may therefore differ from normal setpoint fuel quantity $q_{setpoint\_norm}$. This is true for the time period in which the above-described homogeneous split injection method is used. This time period immediately following the start of the internal combustion engine ends at a point in time $t_E$.

The above-mentioned factor varies in such a way that the average formed over the period ending at point in time $t_E$ corresponds to the setpoint fuel quantity $q_{setpoint}$ of the normal setpoint fuel quantity $q_{setpoint\_norm}$ for each cylinder 12a through 12d. The average of the ratios of setpoint fuel quantity $q_{setpoint}$ and the normal setpoint fuel quantity $q_{setpoint\_norm}$ is thus equal to one for each cylinder 12a through 12d for the above-mentioned period. The ratios prevailing in each combustion cycle of all cylinders 12a through 12d are depicted by dots in FIG. 3. It is apparent that the ratios for each cylinder 12a through 12d vary randomly around the value one.

For the combustion cycles of the individual combustion chambers 14a through 14d at point in time $t_1$ taken here as an example this means that a rather lean mixture is produced in combustion chamber 14a; in combustion chamber 14b a rather rich mixture is produced, in combustion chamber 14c also a rather rich mixture is produced, and also in combustion chamber 14d a rather rich mixture is produced. Due to the rather lean mixture in combustion chamber 14a, excess oxygen is obtained in the exhaust gas leaving this combustion chamber 14a, whereas excess hydrocarbon is obtained in the exhaust gas leaving the other combustion chambers 14b, 14c, and 14*d*. In exhaust gas pipe 26, excess oxygen $O_2$ and hydrocarbons HC are mixed and result in an exothermal reaction which in turn results in a rise in the exhaust gas temperature immediately upstream from catalytic converter system 28.

At point in time $t_2$, again taken as an example, a rather lean mixture is produced in combustion chambers 14*c* and 14*d*, whereas there is a rather rich mixture in combustion chambers 14*a* and 14*b*. As a result, the exhaust gas leaving combustion chambers 14*a* and 14*b* has an excess of HC, whereas the exhaust gas leaving combustion chambers 14*c* and 14*d* has an excess of $O_2$. This again results in the above-mentioned exothermal reaction in exhaust gas pipe 26, which also results in a rise in the exhaust gas temperature. Furthermore, the time-variable combination of HC and $O_2$ excess results in that the exhaust gas becomes more homogeneous in the warming-up phase of the catalytic converter, which results in lower raw HC and $NO_X$ emissions in this phase.

Due to the higher exhaust gas temperature, catalytic converter system 28 is heated more intensively after the start of internal combustion engine 10 and reaches its operating temperature at which it has an optimum conversion rate of the pollutants contained in the exhaust gas relatively rapidly. In this way, the pollutants emitted by internal combustion engine 10 are reduced immediately after the start. Due to the random variation in the desired manner of setpoint fuel quantity $q_{setpoint}$ to be injected, the torque to be generated by internal combustion engine 10 remains generally unaffected overall.

Figure 4:
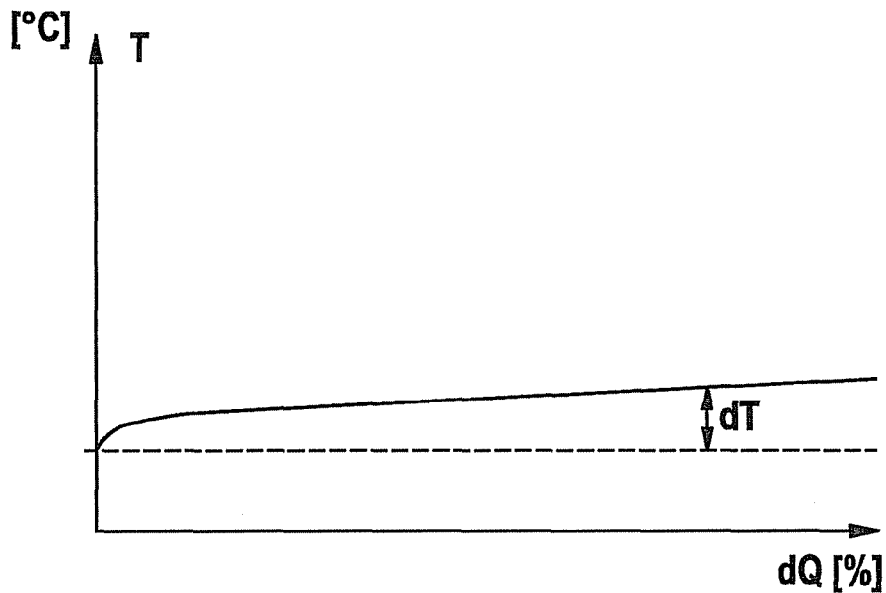
FIG. 4 shows a diagram in which the temperature of the exhaust gas upstream from a catalytic converter of the internal combustion engine of FIG. 1 is plotted against the extent of the variation of the setpoint fuel quantity.
Figure 5:
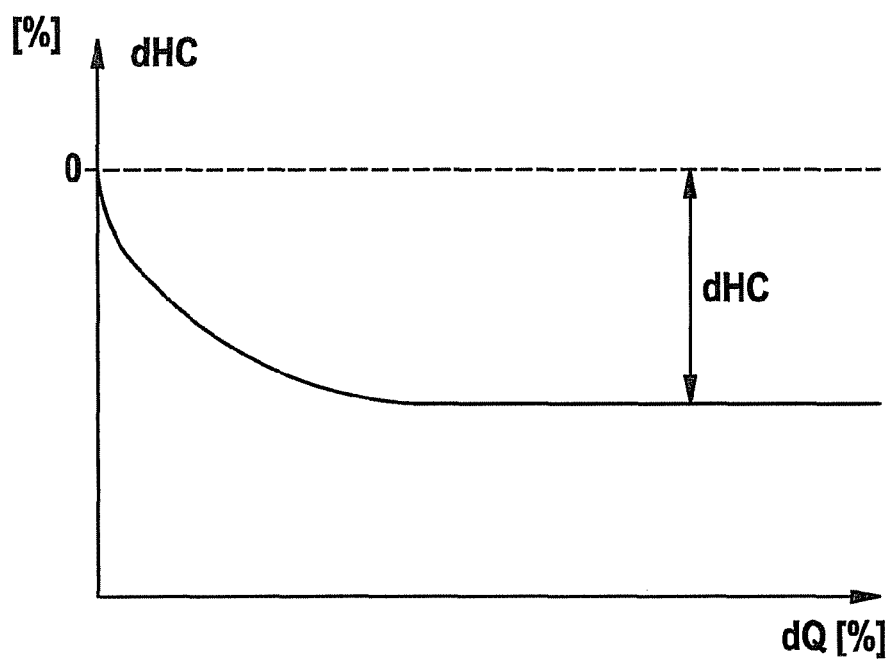
FIG. 5 shows a diagram similar to that of FIG. 4, in which the reduction of the emitted hydrocarbons is plotted against the extent of the variation of the setpoint fuel quantity.

FIG. 4 shows exhaust gas temperature T plotted against the maximum allowable spread dq, i.e., the extent of the variation of setpoint fuel quantity $q_{setpoint}$. It is apparent that a significant increase in the temperature is achieved even at a low spread. Conversely, as is apparent from FIG. 5, even a relatively low spread dq results in a significant reduction dHC in the hydrocarbons emitted by internal combustion engine 10 immediately after the start.

In the above-described exemplary embodiment, setpoint fuel quantity $q_{setpoint}$ to be injected varies individually for each cylinder 12*a* through 12*d*, and independently for the individual cylinders 12*a* through 12*d*. It is also possible to link the variations of the setpoint fuel quantities of the individual combustion chambers in such a way that within one combustion cycle of all combustion chambers the setpoint fuel quantity to be injected averaged over the combustion chambers is equal to the normal setpoint fuel quantity.

The above-described exemplary embodiment is also based on an intentional random variation in a desired manner. A "rigidly" controlled variation is also possible, for example, in the form of a periodic function, preferably a sine function having different periods or a sine function having the same periods and a certain phase shift. An added or reduced fuel quantity is then ascertained via the variation for each cylinder along a predefined curve over time, which provides the setpoint fuel quantity additively with the normal setpoint fuel quantity. A factor varying in a predefined manner, for example, periodically between a value >1 and a value <1, may alternatively be applied to the normal setpoint fuel quantity. The variation over time (in the case of a sine function, for example, defined by the amplitude and period) may also be a function of an instantaneous operating state of the internal combustion engine, for example, an operating temperature.

What is claimed is:

1. A method for operating an internal combustion engine having a plurality of combustion chambers in which fuel is introduced directly into each combustion chamber, the method comprising:

varying a setpoint fuel quantity individually for each cylinder during a time period so that an average of setpoint fuel quantities for all cylinders formed over the time period approximately equals a normal setpoint fuel quantity which would have to be injected without variation of the setpoint fuel quantity, to induce or maintain a setpoint operating state of the internal combustion engine;

wherein the variation is random and predefined by a random function.

2. The method as recited in claim 1, wherein the variation is redefined from one combustion cycle to another.

3. The method as recited in claim 1, wherein the variation is a normal distribution whose highest probability density is at the normal setpoint fuel quantity.

4. The method as recited in claim 3, wherein the varying step includes:

applying a randomly varying, normally distributed factor to the normal setpoint fuel quantity, the factor having a highest probability density of 1.

5. The method as recited in claim 1, wherein the time period begins immediately after a start of the internal combustion engine.

6. The method as recited in claim 1, wherein the fuel is introduced during the time period in each combustion cycle by single or multiple injection.

7. The method as recited in claim 6, wherein the fuel is injected by a homogeneous split injection.

8. The method as recited in claim 7, wherein the time period during which the fuel quantity to be injected varies randomly is equal to the time period during which the homogeneous split injection is performed.

9. The method as recited in claim 8, wherein a normally distributed factor is applied to only one of two homogeneous split injections.

10. The method as recited in claim 1, wherein variations of the individual combustion chambers are linked in such a way that within one combustion cycle of all combustion chambers the setpoint fuel quantity to be injected averaged over the combustion chambers is equal to the normal setpoint fuel quantity.

11. The method as recited in claim 1, wherein the variation is redefined from one combustion cycle to another, wherein the varying step includes applying a randomly varying, normally distributed factor to the normal setpoint fuel quantity, the factor having a highest probability density of 1, wherein the time period begins immediately after a start of the internal combustion engine, wherein the fuel is introduced during the time period in each combustion cycle by single or multiple injection, and wherein variations of the individual combustion chambers are linked so that within one combustion cycle of all combustion chambers the setpoint fuel quantity to be injected averaged over the combustion chambers is equal to the normal setpoint fuel quantity.

12. The method as recited in claim 11, wherein the fuel is injected by a homogeneous split injection, and wherein the time period during which the fuel quantity to be injected varies randomly is equal to the time period during which the homogeneous split injection is performed.

13. The method as recited in claim 7, wherein a normally distributed factor is applied to only one of two homogeneous split injections.

14. The method as recited in claim 1, wherein the variation is a normal distribution whose highest probability density is at the normal setpoint fuel quantity, wherein the varying step includes applying a randomly varying, normally distributed factor to the normal setpoint fuel quantity, the factor having a highest probability density of 1, wherein the time period begins immediately after a start of the internal combustion engine, wherein the fuel is introduced during the time period in each combustion cycle by single or multiple injection, and wherein variations of the individual combustion chambers are linked so that within one combustion cycle of all combustion chambers the setpoint fuel quantity to be injected averaged over the combustion chambers is equal to the normal setpoint fuel quantity.

15. The method as recited in claim 6, wherein the fuel is injected by a homogeneous split injection, and wherein the time period during which the fuel quantity to be injected varies randomly is equal to the time period during which the homogeneous split injection is performed.

16. The method as recited in claim 7, wherein a normally distributed factor is applied to only one of two homogeneous split injections.

17. A medium storing a computer program for operating an internal combustion engine having a plurality of combustion chambers in which fuel is introduced directly into each chamber, the computer program, when executed by a processor, causing the processor to perform:
   varying a setpoint fuel quantity individually for each cylinder during a time period so that an average of setpoint fuel quantities for all cylinders formed over the time period approximately equals a normal setpoint fuel quantity which would have to be injected without variation of the setpoint fuel quantity, to induce or maintain a setpoint operating state of the internal combustion engine;
   wherein the variation is random and predefined by a random function.

18. An electronic memory medium for a control or regulating unit of an internal combustion engine, having a plurality of chambers in which fuel is introduced directly into each chamber, the computer program, when executed by the unit, causing the unit to perform:
   varying a setpoint fuel quantity individually for each cylinder during a time period so that an average of setpoint fuel quantities for all cylinders formed over the time period approximately equals a normal setpoint fuel quantity which would have to be injected without variation of the setpoint fuel quantity, to induce or maintain a setpoint operating state of the internal combustion engine;
   wherein the variation is random and predefined by a random function.

19. A control or regulating unit for an internal combustion engine, having a plurality of chambers in which fuel is introduced directly into each chamber, the control unit adapted to perform:
   varying a setpoint fuel quantity individually for each cylinder during a time period so that an average of setpoint fuel quantities for all cylinders formed over the time period approximately equals a normal setpoint fuel quantity which would have to be injected without variation of the setpoint fuel quantity, to induce or maintain a setpoint operating state of the internal combustion engine;
   wherein the variation is random and predefined by a random function.

* * * * *